(12) United States Patent
Kurz et al.

(10) Patent No.: US 11,283,324 B2
(45) Date of Patent: Mar. 22, 2022

(54) DRIVE DEVICE, HYDRAULIC PUMP, MOTOR VEHICLE

(71) Applicant: Robert Bosch GmbH, Stuttgart (DE)

(72) Inventors: Edgar Kurz, Heilbronn-Horkheim (DE); Juergen Haecker, Schwieberdingen (DE); Massimiliano Ambrosi, Abstatt (DE); Michael Eisenlauer, Affalterbach (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 16/545,336

(22) Filed: Aug. 20, 2019

(65) Prior Publication Data

US 2020/0106326 A1    Apr. 2, 2020

(30) Foreign Application Priority Data

Sep. 27, 2018    (DE) .................... 10 2018 216 558.0

(51) Int. Cl.
| | |
|---|---|
| *H02K 5/14* | (2006.01) |
| *F04B 17/03* | (2006.01) |
| *H02K 5/10* | (2006.01) |
| *B60T 13/16* | (2006.01) |
| *B60T 17/02* | (2006.01) |
| *H02K 5/173* | (2006.01) |
| *H02K 5/124* | (2006.01) |
| *H02K 7/075* | (2006.01) |
| *H01R 39/38* | (2006.01) |
| *H01R 39/26* | (2006.01) |

(Continued)

(52) U.S. Cl.
CPC .............. *H02K 5/148* (2013.01); *B60T 13/16* (2013.01); *B60T 17/02* (2013.01); *F04B 17/03* (2013.01); *H01R 39/388* (2013.01); *H02K 5/10* (2013.01); *H02K 5/124* (2013.01); *H02K 5/1732* (2013.01); *H02K 7/075* (2013.01); *F04B 9/045* (2013.01); *F04B 53/006* (2013.01); *H01R 39/26* (2013.01); *H01R 39/381* (2013.01)

(58) Field of Classification Search
CPC .................................. B60T 13/16; B60T 17/02
See application file for complete search history.

(56) References Cited

U.S. PATENT DOCUMENTS

| | | | | |
|---|---|---|---|---|
| 5,004,943 | A | * | 4/1991 | Gagneux ................. H02K 5/148 310/239 |
| 5,668,422 | A | * | 9/1997 | Deynet ................. B60T 8/3675 310/239 |

(Continued)

FOREIGN PATENT DOCUMENTS

DE    19720615    * 6/1998

*Primary Examiner* — Charles G Freay
(74) *Attorney, Agent, or Firm* — Maginot, Moore & Beck LLP

(57) ABSTRACT

A drive device for a hydraulic pump of a braking system for a motor vehicle includes a housing, a rotor, a rotor shaft mounted in the housing and supporting the rotor, and a commutator arranged in the housing. The commutator includes at least one commutator brush held by a brush holder. The commutator brush cooperates with a commutator ring arranged on the rotor shaft in a non-rotatable manner. The brush holder includes a sealing ring assigned to the commutator which is arranged coaxially to the rotor shaft and interacts with the rotor shaft in a sealing manner.

12 Claims, 2 Drawing Sheets

(51) Int. Cl.
*F04B 9/04* (2006.01)
*F04B 53/00* (2006.01)

(56) References Cited

U.S. PATENT DOCUMENTS

| | | | | |
|---|---|---|---|---|
| 6,200,109 | B1 * | 3/2001 | Dinkel | B60T 8/368 417/273 |
| 6,732,631 | B1 * | 5/2004 | Bitzer | B60T 8/368 384/494 |
| 6,745,667 | B1 * | 6/2004 | Dinkel | B60T 8/368 417/415 |
| 9,821,782 | B2 * | 11/2017 | Kodama | H02K 5/148 |

* cited by examiner

DRIVE DEVICE, HYDRAULIC PUMP, MOTOR VEHICLE

This application claims priority under 35 U.S.C. § 119 to patent application no. DE 10 2018 216 558.0, filed on Sep. 27, 2018 in Germany, the disclosure of which is incorporated herein by reference in its entirety.

The disclosure relates to a drive device for a hydraulic pump of a braking system in a motor vehicle, having a rotor shaft mounted in a housing and supporting a rotor, in particular having arranged on the rotor shaft an eccentric bearing which has an inner ring arranged on the rotor shaft in a non-rotatable manner and an outer ring configured at least substantially in a merely orbiting manner for actuation of at least one pump piston, having a commutator arranged in the housing which comprises at least one commutator brush held by a brush holder, which commutator brush cooperates with a commutator ring arranged on the rotor shaft.

The disclosure furthermore relates to a hydraulic pump having one or multiple pump pistons and having the previously described drive device which drives the pump piston by means of the eccentric bearing. Moreover, the disclosure relates to a braking system for a motor vehicle having a hydraulic pump of this kind and also to a motor vehicle having a braking system of this kind.

BACKGROUND

Drive devices of the kind referred to above are known from the prior art. In order to operate hydraulic systems, it is known in the art for hydraulic pressure to be generated with the help of one or multiple drivable hydraulic pumps. Piston pumps have proved efficient in this case. In order to drive these, it is known in the art for a rotating or orbiting eccentric cam to be used, in order to drive one or multiple piston pumps. The pump pistons of the piston pumps in this case are oriented radially to the rotational axis of the eccentric cam and pressed against the outside of the eccentric cam by spring pretensioning so that, during a rotation of the shaft supporting the eccentric cam, the pump pistons are driven radially. In order to prevent the outer part of the eccentric bearing from performing a rotational movement in addition to the orbiting movement, it is known in the art for the eccentric bearing to be configured with an inner ring and an outer ring that is displaceable relative thereto, wherein roller bodies, in particular needle bodies, are arranged between the inner ring and the outer ring. The inner ring is connected to the rotor shaft in a non-rotatable manner and the rotational movement of the inner ring is not transmitted to the outer ring by the roller bodies. Relative movements and wear between the piston pumps and the eccentric cam are thereby avoided. In this case, the contact pressure of the pump pistons on the eccentric cam is frequently sufficient to prevent a rotational movement of the outer ring.

SUMMARY

The drive device according to the disclosure has the advantage that in a simple and cost-effective manner it prevents fluid from reaching the commutator or the housing of the electric motor and abrasion from the commutator which can escape from the housing through the edges created by the commutator brushes rubbing on the commutator ring and reach a hydraulic pump driven by the drive device or the optional eccentric bearing. According to the disclosure, it should be provided for this purpose that the brush holder has a sealing ring assigned to the commutator which is arranged coaxially to the rotor shaft and interacts with the rotor shaft in a sealing manner. Because the brush holder is present in any event, no additional support is required to hold a sealing ring. The sealing ring surrounds or encloses the rotor shaft and thereby prevents fluid from migrating in one or the other direction and also the penetration or escape of dirt particles, in particular of abrasion dust from the commutator. By arranging the sealing ring on the brush holder, easy assembly and also a compact structure of the drive device are guaranteed.

According to a preferred development of the disclosure, the brush holder is produced from plastic. This means that the brush holder is only lightweight and, moreover, is electrically non-conductive, which means that simple and electrically safe storage of the commutator brushes is guaranteed.

Furthermore, the sealing ring is preferably produced from plastic. This means that the sealing ring also has a cost-effective and weight-saving design. The sealing ring in this case is preferably produced from the same material as the brush holder or, alternatively, from a different plastics material. If the brush holder and sealing ring are made of different plastics materials, different properties can be utilized. Hence, for example, the brush holder is produced from a harder plastics material, in order to guarantee a secure mounting of the commutator brushes, and the sealing ring is made from a less hard plastics material, in particular one that is elastically deformable, which provides an advantageous seal in conjunction with the rotor shaft. In this case, the brush holder and sealing ring are preferably configured as two-component injection-molded parts which thereby create a fixed unit that allows easy assembly.

According to a preferred development of the disclosure, the brush holder and the sealing ring are integrally formed and therefore comprise the same material. This makes particularly cost-effective production possible.

According to a preferred development of the disclosure, the sealing ring has a sealing lip-shaped design. An advantageous bearing of the sealing ring on the rotor shaft with little wear is thereby guaranteed. Particularly for this purpose, the sealing ring is elastically deformable, at least in sections, so that tolerances are balanced and wear reduced.

It is particularly preferable for the sealing ring to have a tapered design running up to its inner diameter or else in the direction of the rotor shaft. This means that the sealing ring only has a small bearing surface which may be, or is, in physical contact with the rotor shaft.

Furthermore, it is preferably provided that the sealing ring has a conical design viewed in the longitudinal section. In this case, the conical shape particularly points away from the commutator, so that the inner diameter of the sealing ring increases in the direction of the commutator. In this way, the sealing ring creates an advantageous fluid barrier for fluid coming from outside.

According to a preferred development of the disclosure, the sealing ring is arranged between the commutator and a roller body bearing supporting the rotor shaft in the housing. The sealing ring thereby protects the commutator, particularly from fluid which is conveyed through the roller body in the direction of the commutator, and it protects the roller body bearing from abrasion dust that can occur in the commutator.

The hydraulic pump according to the disclosure is characterized in that the drive device is configured according to the disclosure and results in the advantages already referred to above.

The braking system according to the disclosure is characterized by the hydraulic pump according to the disclosure and results in the advantages already referred to above.

The motor vehicle according to the disclosure comprises the braking system according to the disclosure and results in the aforementioned advantages.

BRIEF DESCRIPTION OF THE DRAWINGS

Further advantages and preferred features and combinations of features result from what has previously been described and also from the claims. The disclosure is to be explained in greater detail below with the help of the drawing. For this purpose

DETAILED DESCRIPTION

Figure 1:
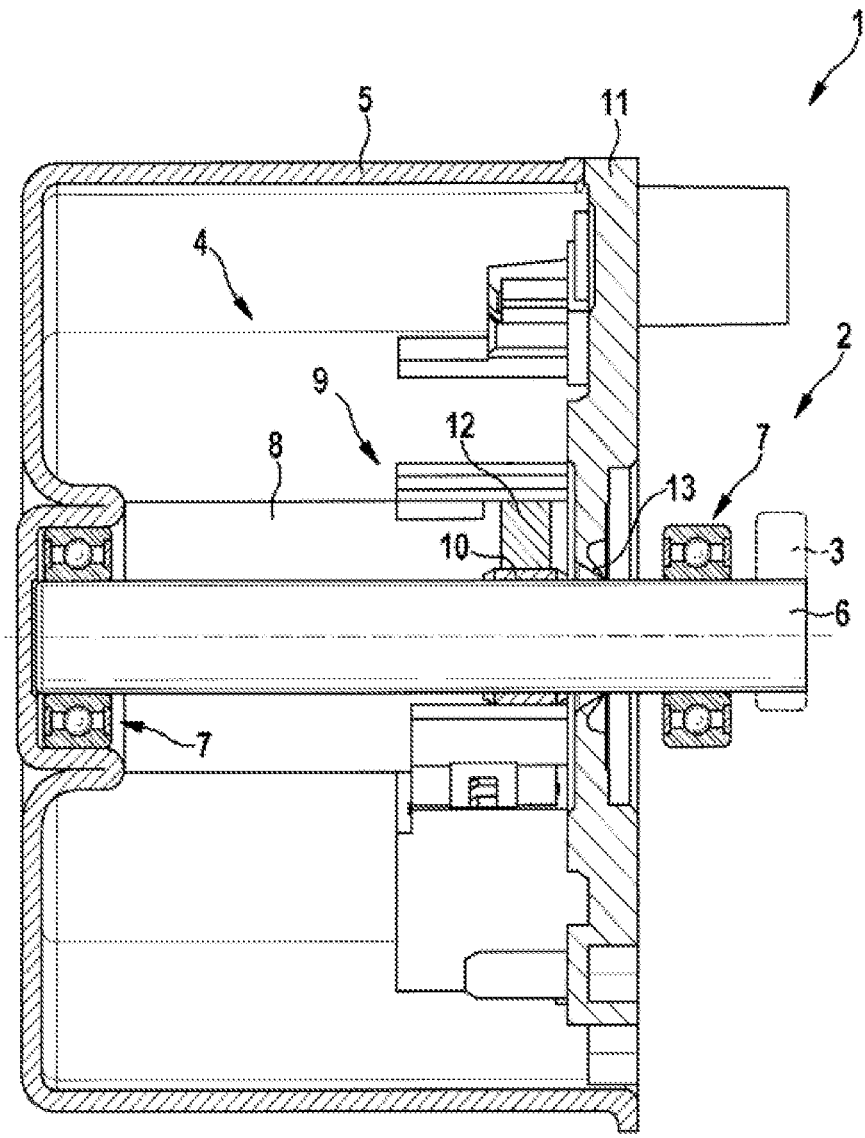
FIG. 1 shows a hydraulic pump for a braking system of a motor vehicle as a simplified sectional representation and FIG. 2 shows a perspective longitudinal section through a brush holder of the hydraulic pump.

FIG. 1 shows as a simplified longitudinal sectional depiction a drive device 1 for a hydraulic pump 2 not shown in greater detail here which has at least one pump piston that can be driven by an eccentric bearing 3 drivable by the drive device 1. The eccentric bearing 3 is only shown in dotted lines in FIG. 1.

The drive device 1 has an electric motor 4 which exhibits a housing 5 with a rotor shaft 6 rotatably mounted therein. The rotor shaft 6 is rotatably mounted in the housing 5 by multiple roller body bearings 7. Moreover, a rotor 8 is arranged in a non-rotatable manner on the rotor shaft 6 and also an inner ring of the eccentric bearing 3. Furthermore, the electric motor 4 has a commutator 9 which has a commutator ring 10 arranged in a non-rotatable manner on the rotor shaft 6 and also a plurality of commutator brushes 12 carried by a brush holder 11. The commutator brushes 12 in this case are elastically pretensioned radially against the commutator ring 10, in order to interact therewith.

The commutator ring 10 in this case is arranged between the rotor 8 and one of the roller body bearings 7 and the eccentric bearing 3 in the housing 5. The brush holder 11 is disc-shaped, in particular washer-shaped, and substantially closes off the housing 5 at the front end and is arranged coaxially to the rotor shaft 6 in the housing 5. On its inner diameter, the brush holder 11 has a sealing ring 13. The sealing ring 13 is configured integrally with the brush holder 11 and has a sealing lip shape. For this purpose, the sealing ring 13 tapers in the direction of the rotor shaft 6. In this case, the sealing lip is not oriented radially, but inclined obliquely thereto, so that the sealing ring 13 has a conical shape viewed in the longitudinal section, with an inner diameter which increases in the direction of the commutator 9.

The sealing ring 13 and the rotary housing 11 are produced from plastic, wherein the sealing ring 13, in particular, is elastically deformable at least in sections. The inner diameter of the sealing ring 13 is chosen in such a manner that the sealing ring rests on the outside or else the outer casing wall of the rotor shaft 6. Due to the elastic deformability and thin bearing surface at the tip, there is only a small amount of wear in this case.

Figure 2:
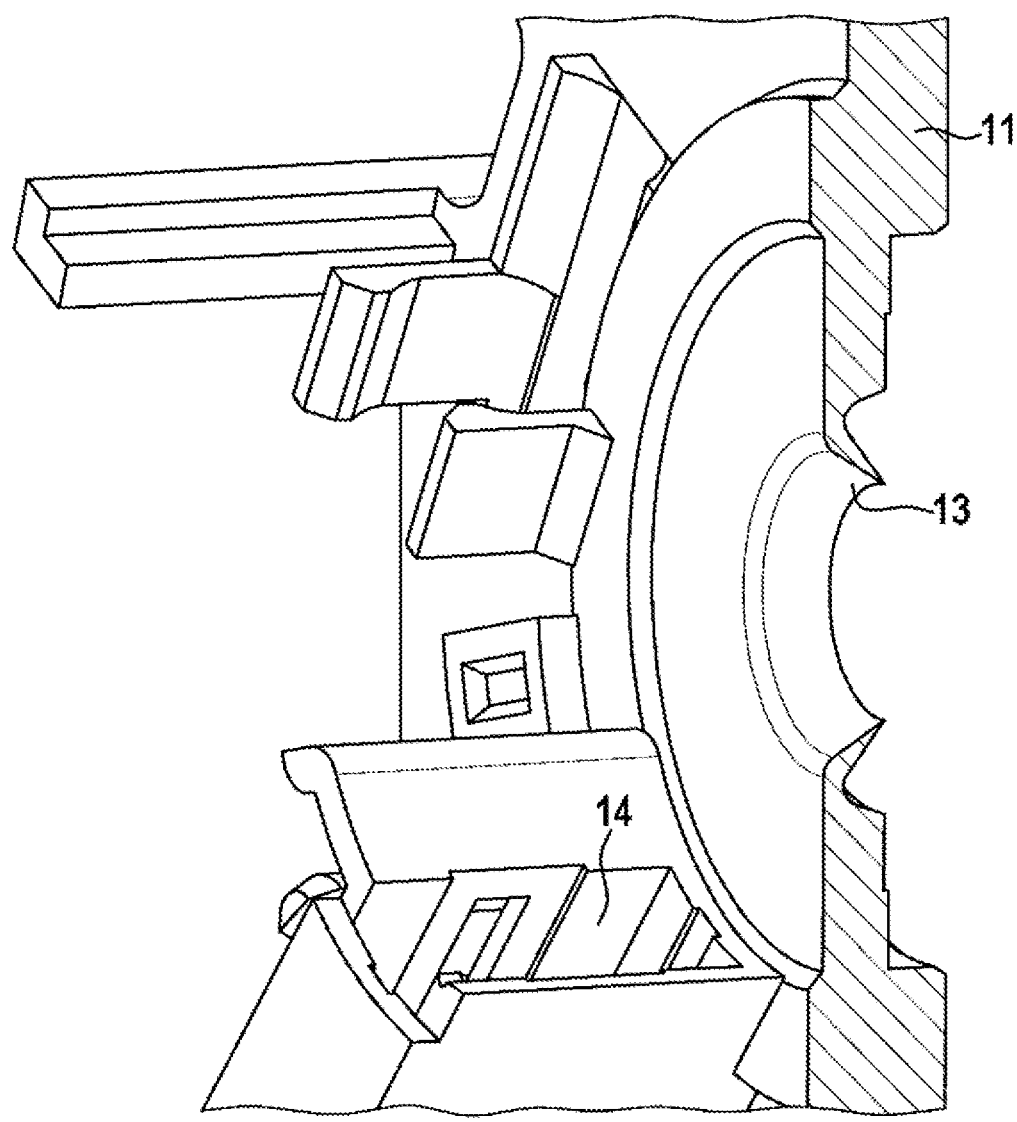

FIG. 2 shows the brush holder 11 as a perspective sectional depiction with the sealing ring 13 configured thereon. A brush housing 14 can also be seen in the sectional depiction with which a commutator brush can be pushed in against the force of a spring element, in order to be forced by the spring force in the direction of the commutator ring 10 in the mounted state. The integral design means that the brush holder 11 and the sealing ring 13 can be produced easily and cost-effectively.

The contour of the sealing ring 13 in this case lies particularly in the main demolding direction of the injection-molding tool and can therefore be realized without special additional costs. The building space required for integrating the proposed embodiment usually already exists in the drive device. The sealing ring 13 with the stripping geometry preferably lies with slight pretensioning on the rotor shaft 6 or on the outer casing wall thereof, in order to create a safe seal against fluid and abrasion dust. The pretensioning is achieved, for example, in that the shaft through opening is smaller in the unmounted state than the outer diameter of the rotor shaft 6 in a section assigned to the sealing ring 13.

According to an alternative exemplary embodiment not shown here, the brush holder 11 and the sealing ring 13 are preferably produced as a two-component injection-molded part, in other words using the two-component injection molding method. In this way, a plastic with a different, in particular higher, elasticity than for the brush holder 11 can be used for the sealing ring 13, for example. In this way, the two elements can be optimally adapted to their respective functions.

What is claimed is:

1. A drive device for a hydraulic pump of a braking system for a motor vehicle, comprising:
    a motor housing;
    a rotor;
    a rotor shaft including a motor end mounted in the motor housing and supporting the rotor, and a hydraulic pump end; and
    a commutator arranged in the motor housing and including at least one commutator brush, a brush holder holding the at least one commutator brush, and a commutator ring arranged on the rotor shaft in a non-rotatable manner,
    wherein
        the at least one commutator brush is configured to cooperate with the commutator ring,
        the brush holder includes a sealing ring, the sealing ring arranged coaxially to the rotor shaft and configured to directly contact the rotor shaft in a sealing manner to prevent fluid from reaching the commutator ring, and
        the sealing ring extends obliquely with respect to a longitudinal axis of the rotor shaft.

2. The drive device according to claim 1, wherein the brush holder is comprised of plastic.

3. The drive device according to claim 1, wherein the sealing ring is comprised of plastic.

4. The drive device according to claim 1, wherein the brush holder and the sealing ring are integrally formed.

5. The drive device according to claim 1, wherein the sealing ring defines a sealing lip-shape.

6. The drive device according to claim 1, wherein the sealing ring includes an elastically deformable tip contacting the rotor shaft.

7. The drive device according to claim 1, wherein the sealing ring tapers in a radially inwardly direction toward the rotor shaft.

8. The drive device according to claim 1, wherein the sealing ring has a conical shape in a longitudinal direction along the shaft.

9. The drive device according to claim 1, further comprising:

a roller body bearing supporting the rotor shaft,
wherein the sealing ring is arranged between the commutator and the roller body bearing.

10. The drive device according to claim 1, further comprising:
an eccentric bearing configured to actuate at least one pump piston of the hydraulic pump and arranged on a side of the brush holder facing away from the commutator on the hydraulic pump end of the rotor shaft.

11. A hydraulic pump for a braking system of a motor vehicle, comprising:
at least one actuable pump piston; and
a drive device configured to actuate the at least one actuable pump piston, the drive device including:
a housing;
a rotor;
a rotor shaft mounted in the housing and supporting the rotor; and
a commutator arranged in the housing and including at least one commutator brush, a brush holder holding the at least one commutator brush, and a commutator ring arranged on the rotor shaft in a non-rotatable manner, wherein
the at least one commutator brush is configured to cooperate with the commutator ring,
the brush holder includes a sealing ring, the sealing ring arranged coaxially to the rotor shaft and configured to directly contact the rotor shaft in a sealing manner, and
the sealing ring extends obliquely with respect to a longitudinal axis of the rotor shaft.

12. A braking system for a motor vehicle, comprising:
a hydraulic pump including:
at least one actuable pump piston; and
a drive device configured to actuate the at least one actuable pump piston, the drive device including:
a housing;
a rotor;
a rotor shaft mounted in the housing and supporting the rotor; and
a commutator arranged in the housing and including at least one commutator brush, a brush holder holding the at least one commutator brush, and a commutator ring arranged on the rotor shaft in a non-rotatable manner, wherein
the at least one commutator brush is configured to cooperate with the commutator ring,
the brush holder includes a sealing ring, the sealing ring arranged coaxially to the rotor shaft and configured to directly contact the rotor shaft in a sealing manner, and
the sealing ring extends obliquely with respect to a longitudinal axis of the rotor shaft.

* * * * *